United States Patent
Ma

(10) Patent No.: US 11,652,588 B2
(45) Date of Patent: May 16, 2023

(54) APERIODIC ZP CSI-RS RESOURCE SET DETERMINATION AND CONFIGURATION METHODS AND DEVICES, STORAGE MEDIUM, USER EQUIPMENT, AND NETWORK END

(71) Applicant: BEIJING UNISOC COMMUNICATIONS TECHNOLOGY CO., LTD., Beijing (CN)

(72) Inventor: Dawei Ma, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 77 days.

(21) Appl. No.: 17/265,908

(22) PCT Filed: Jul. 19, 2019

(86) PCT No.: PCT/CN2019/096772
§ 371 (c)(1),
(2) Date: Feb. 4, 2021

(87) PCT Pub. No.: WO2020/029769
PCT Pub. Date: Feb. 13, 2020

(65) Prior Publication Data
US 2021/0167919 A1 Jun. 3, 2021

(30) Foreign Application Priority Data
Aug. 8, 2018 (CN) .......................... 201810896624.4

(51) Int. Cl.
*H04L 5/00* (2006.01)
*H04W 72/04* (2009.01)
*H04W 72/0446* (2023.01)

(52) U.S. Cl.
CPC ......... *H04L 5/0048* (2013.01); *H04W 72/042* (2013.01); *H04W 72/0446* (2013.01)

(58) Field of Classification Search
CPC ........................... H04L 5/0048; H04W 72/042
See application file for complete search history.

(56) References Cited

U.S. PATENT DOCUMENTS

| 2015/0162966 | A1 | 6/2015 | Kim et al. |
| 2016/0227548 | A1 | 8/2016 | Nimbalker et al. |
| 2019/0312621 | A1* | 10/2019 | Nam ...................... H04W 76/27 |

FOREIGN PATENT DOCUMENTS

| CN | 104428998 A | 3/2015 |
| WO | WO-2017166024 A1 | 10/2017 |

OTHER PUBLICATIONS

Ericsson, "On RRC Parameter Alignment between 38.214 and 38.331" 3GPP TSG RAN WG1 Meeting #92bis R1-1805001, Apr. 20, 2018 (Apr. 20, 2018), sections 5.1.4.1-5.1.4.2.

(Continued)

*Primary Examiner* — Ronald B Abelson
(74) *Attorney, Agent, or Firm* — Harness, Dickey & Pierce, P.L.C.

(57) ABSTRACT

Aperiodic ZP CSI-RS resource set determination and configuration methods and devices, a storage medium, a user equipment, and a network end. The determination method comprises: receiving a PDCCH, and the PDCCH scheduling K time slots for transmitting a PDSCH; extracting from the PDCCH a preset number of bits of indication information of an aperiodic ZP CSI-RS resource set; extracting $\lceil \log_2 J \rceil$ bits from the indication information, and determining a selected aperiodic ZP CSI-RS resource set according to an extraction result; and determining, according to a comparison result between the number of bits of the indication information and $\lceil \log_2 J \rceil$, the position of a ZP CSI-RS resource indicated by the selected aperiodic ZP CSI-RS resource set in the K time (Continued)

slots. The solution of the invention enables UE to accurately determine a selected aperiodic ZP CSI-RS resource, thereby improving the accuracy of decoding.

20 Claims, 6 Drawing Sheets

(56) References Cited

OTHER PUBLICATIONS

Nokia et al. "Summary of Open Issues Related to Rate-Matching in NR" 3GPP TSG-RAN WG1 #92bis R1-1805518, Apr. 20, 2018 (Apr. 20, 2018), entire document.
International Search Report (English and Chinese) and Written Opinion (Chinese) of the International Searching Authority issued in PCT/CN2019/096772, dated Oct. 18, 2019; ISA/CN.
Ericsson: "Remaining issues on CSI measurement", 3GPP Draft; RI-1805267, vol. RAN WGI, No. Sanya, China; Apr. 16, 2018-Apr. 20, 2018 Apr. 16, 2018 (Apr. 16, 2018), XP051427521, Retrieved from the Internet: URL:http://www.3gpp.org/ftp/Meetings%5F3GPP%5FSYNC/RAN1/Docs/ [retrieved on Apr. 16, 2018] * Sections 1-2 *.
Huawei et al.: "Feature lead summary of CSI-RS #2", 3GPP Draft; RI-1807717, vol. RAN WGI, No. Busan, Korea; May 21, 2018-May 25, 2018 May 24, 2018 (May 24, 2018), XP051463344, Retrieved from the Internet: URL:http://www.3gpp.org/ftp/tsg%5Fran/WG1%5FRL1/TSGR1%5F93/Docs [retrieved on May 24, 2018] * Sections 1-4.*.
Extended European Search Report regarding Application No. 19846325.9, dated Mar. 30, 2022.

* cited by examiner

APERIODIC ZP CSI-RS RESOURCE SET DETERMINATION AND CONFIGURATION METHODS AND DEVICES, STORAGE MEDIUM, USER EQUIPMENT, AND NETWORK END

CROSS-REFERENCE TO RELATED APPLICATIONS

This application is the national phase of International Application No. PCT/CN2019/096772, filed on Jul. 19, 2019, which claims the benefit of priority to Chinese Patent Application No. 201810896624.4, filed on Aug. 8, 2018, and entitled "APERIODIC ZP CSI-RS RESOURCE SET DETERMINATION AND CONFIGURATION METHODS AND DEVICES, STORAGE MEDIUM, USER EQUIPMENT, AND NETWORK END". The entire disclosures of the above applications are incorporated herein by reference.

TECHNICAL FIELD

The present disclosure generally relates to communication technology field, and more particularly, to an aperiodic ZP CSI-RS resource set determination method and device, an aperiodic ZP CSI-RS resource set configuration method and device, a storage medium, a user equipment, and a network end.

BACKGROUND

In Long Term Evolution (LTE), the configuration method of Zero Power Channel State Information Reference Signal (ZP CSI-RS) is: an upper layer configures up to 4 aperiodic ZP CSI-RS resources to a User Equipment (UE); when a base station sends a Physical Downlink Control Channel (PDCCH) to the UE to schedule a Physical Downlink Shared Channel (PDSCH), the PDCCH includes 2 bits to indicate an activated aperiodic ZP CSI-RS resource, so as to inform the UE that there is no data at the location of the activated ZP CSI-RS resource.

In LTE, because the PDSCH does not support Slot Aggregation, while being activated, the ZP CSI-RS is defaulted to be located in the single time slot occupied by the PDSCH, that is, there is no need to confirm the slot number.

However, in New Radio (NR) Slot Aggregation, the PDCCH may be used to schedule multiple timeslots to send the PDSCH. If the PDCCH sent by the base station to the UE includes an indication information to activate the aperiodic ZP CSI-RS, because the protocol does not specify which time slot of PDSCH the ZP CSI-RS is located in, the UE cannot extract data correctly, and thus cannot decode accurately.

SUMMARY

Embodiments of the present disclosure provide an aperiodic ZP CSI-RS resource set determination method and device, an aperiodic ZP CSI-RS resource set configuration method and device, a storage medium, a user equipment (UE), and a network end, which can make the UE determine a selected aperiodic ZP CSI-RS resource more accurately, thereby improving decoding accuracy.

In an embodiment of the present disclosure, an aperiodic ZP CSI-RS resource set determination method is provided, including: receiving a Physical Downlink Control Channel (PDCCH), wherein the PDCCH schedules K time slots for transmitting a Physical Downlink Shared Channel (PDSCH); extracting an indication information of the aperiodic ZP CSI-RS resource set from the PDCCH, wherein the indication information has a preset number of bits; extracting $\lceil \log_2 J \rceil$ bits from the indication information, and determining a selected aperiodic ZP CSI-RS resource set according to an extraction result, where J is a number of available aperiodic ZP CSI-RS resource sets; and determining, according to a comparison result between the number of bits of the indication information and $\lceil \log_2 J \rceil$, a position of a ZP CSI-RS resource indicated by the selected aperiodic ZP CSI-RS resource set in the K time slots; wherein K is a positive integer and J is a positive integer.

Optionally, determining a selected aperiodic ZP CSI-RS resource set according to an extraction result includes: determining a value of the extraction result, and wherein a sequence number of the selected aperiodic ZP CSI-RS resource set in the J available aperiodic ZP CSI-RS resource sets is equal to the value of the extraction result.

Optionally, determining, according to a comparison result between the number of bits of the indication information and $\lceil \log_2 J \rceil$, a position of a ZP CSI-RS resource indicated by the selected aperiodic ZP CSI-RS resource set in the K time slots includes: if the number of bits of the indication information is equal to $\lceil \log_2 J \rceil$, determining that the selected aperiodic ZP CSI-RS resource set is located in a first time slot of the K time slots.

Optionally, determining, according to a comparison result between the number of bits of the indication information and $\lceil \log_2 J \rceil$, a position of a ZP CSI-RS resource indicated by the selected aperiodic ZP CSI-RS resource set in the K time slots includes: if the number of bits of the indication information is equal to $\lceil \log_2 J \rceil$, determining that the selected aperiodic ZP CSI-RS resource set is located in all of the K time slots of the PDSCH.

Optionally, determining, according to a comparison result between the number of bits of the indication information and $\lceil \log_2 J \rceil$, a position of a ZP CSI-RS resource indicated by the selected aperiodic ZP CSI-RS resource set in the K time slots includes: if the number of bits of the indication information is equal to $\lceil \log_2 J \rceil$, extracting an offset from the selected aperiodic ZP CSI-RS resource set, where a number of bits occupied by the offset is $\lceil \log_2 K \rceil$; and according to a value of the offset, determining the position of the selected aperiodic ZP CSI-RS resource set in the K time slots.

Optionally, determining, according to a comparison result between the number of bits of the indication information and $\lceil \log_2 J \rceil$, a position of a ZP CSI-RS resource indicated by the selected aperiodic ZP CSI-RS resource set in the K time slots includes: if the number of bits of the indication information is greater than $\lceil \log_2 J \rceil$, determining remaining bits of the indication information except for the $\lceil \log_2 J \rceil$ bits; and according to a value of the remaining bits of the indication information, determining the position of the selected aperiodic ZP CSI-RS resource set in the K time slots.

Optionally, a number of the remaining bits of the indication information is $\lceil \log_2 K \rceil$, and the number of bits of the indication information is a sum of $\lceil \log_2 J \rceil$ and $\lceil \log_2 K \rceil$.

In an embodiment of the present disclosure, an aperiodic ZP CSI-RS resource set configuration method is provided, including: determining a position of an aperiodic ZP CSI-RS resource set selected for a user equipment in K time slots; according to the position, using at least $\lceil \log_2 J \rceil$ bits to configure an indication information of the aperiodic ZP CSI-RS resource set, where J is a number of available aperiodic ZP CSI-RS resource sets; sending a Physical Downlink Control Channel (PDCCH) to the user equipment, so that the user equipment extracts the indication information of the aperiodic ZP CSI-RS resource set with a preset number of bits from the PDCCH, determines a selected aperiodic ZP CSI-RS resource set according to an extraction result, and determines a position of a ZP CSI-RS resource indicated by the selected aperiodic ZP CSI-RS resource set in the K time slots; wherein the PDCCH schedules the K time slots for transmitting a Physical Downlink Shared Channel (PDSCH), where K is a positive integer and J is a positive integer.

Optionally, using at least $\lceil \log_2 J \rceil$ bits to configure an indication information of the aperiodic ZP CSI-RS resource set includes: determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; configuring the selected aperiodic ZP CSI-RS resource set to be located in a first time slot of the K time slots, and using the value of the $\lceil \log_2 J \rceil$ bits as the indication information of the aperiodic ZP CSI-RS resource set.

Optionally, using at least $\lceil \log_2 J \rceil$ bits to configure an indication information of the aperiodic ZP CSI-RS resource set includes: determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; and configuring the selected aperiodic ZP CSI-RS resource set to be located in all of the K time slots of the PDSCH, and using the value of the $\lceil \log_2 J \rceil$ bits as the indication information of the aperiodic ZP CSI-RS resource set.

Optionally, using at least $\lceil \log_2 J \rceil$ bits to configure an indication information of the aperiodic ZP CSI-RS resource set includes: determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; determining a value of an offset according to the position of the selected aperiodic ZP CSI-RS resource set in the K time slots, where a number of bits occupied by the offset is $\lceil \log_2 K \rceil$; and configuring the offset in the selected aperiodic ZP CSI-RS resource set; using the value of the $\lceil \log_2 J \rceil$ bits as the indication information of the aperiodic ZP CSI-RS resource set.

Optionally, using at least $\lceil \log_2 J \rceil$ bits to configure an indication information of the aperiodic ZP CSI-RS resource set includes: determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; and determining a value of a remaining bits according to the position of the selected aperiodic ZP CSI-RS resource set in the K time slots; using the value of the $\lceil \log_2 J \rceil$ bits and the value of the remaining bits as the indication information of the aperiodic ZP CSI-RS resource set.

Optionally, a number of the remaining bits of the indication information is $\lceil \log_2 K \rceil$, and the number of bits of the indication information is a sum of $\lceil \log_2 J \rceil$ and $\lceil \log_2 K \rceil$.

In an embodiment of the present disclosure, an aperiodic ZP CSI-RS resource set determination device is provided, including: a receiving module, adapted to receive a Physical Downlink Control Channel (PDCCH), wherein the PDCCH schedules K time slots for transmitting a Physical Downlink Shared Channel (PDSCH); an instruction information extraction module, adapted to extract an indication information of the aperiodic ZP CSI-RS resource set from the PDCCH, wherein the indication information has a preset number of bits; a first resource set determination module, adapted to extract $\lceil \log_2 J \rceil$ bits from the indication information, and determine a selected aperiodic ZP CSI-RS resource set according to an extraction result, where J is a number of available aperiodic ZP CSI-RS resource sets; and a position determination module, adapted to determine, according to a comparison result between the number of bits of the indication information and $\lceil \log_2 J \rceil$, a position of a ZP CSI-RS resource indicated by the selected aperiodic ZP CSI-RS resource set in the K time slots; wherein K is a positive integer and J is a positive integer.

Optionally, the first resource set determination module includes: an extraction result determination sub-module, adapted to determining a value of the extraction result, where a sequence number of the selected aperiodic ZP CSI-RS resource set in the J available aperiodic ZP CSI-RS resource sets is equal to the value of the extraction result.

Optionally, the position determination module includes: a first position determination sub-module, adapted to determine that the selected aperiodic ZP CSI-RS resource set is located in a first time slot of the K time slots, if the number of bits of the indication information is equal to $\lceil \log_2 J \rceil$.

Optionally, the position determination module includes: a second position determination sub-module, adapted to determine that the selected aperiodic ZP CSI-RS resource set is located in all of the K time slots of the PDSCH, if the number of bits of the indication information is equal to $\lceil \log_2 J \rceil$.

Optionally, the position determination module includes: an offset extraction sub-module, adapted to, if the number of bits of the indication information is equal to $\lceil \log_2 J \rceil$, extract an offset from the selected aperiodic ZP CSI-RS resource set, where a number of bits occupied by the offset is $\lceil \log_2 K \rceil$; and a third position determination sub-module, adapted to determine the position of the selected aperiodic ZP CSI-RS resource set in the K time slots according to a value of the offset.

Optionally, the position determination module includes: a first remaining bits determination sub-module, adapted to determine a remaining bits of the indication information except for the $\lceil \log_2 J \rceil$ bits, if the number of bits of the indication information is greater than $\lceil \log_2 J \rceil$; and a fourth position determination sub-module, adapted to determine the position of the selected aperiodic ZP CSI-RS resource set in the K time slots, according to a value of the remaining bits of the indication information.

Optionally, a number of the remaining bits of the indication information is $\lceil \log_2 K \rceil$, and the number of bits of the indication information is a sum of $\lceil \log_2 J \rceil$ and $\lceil \log_2 K \rceil$.

In an embodiment of the present disclosure, an aperiodic ZP CSI-RS resource set configuration device is provided, including: a second resource set determination module, adapted to determine a position of an aperiodic ZP CSI-RS resource set selected for a user equipment in K time slots; a configuration module, adapted to, according to the position, use at least $\lceil \log_2 J \rceil$ bits to configure an indication information of the aperiodic ZP CSI-RS resource set, where J is a number of available aperiodic ZP CSI-RS resource sets; and a sending module, adapted to send a Physical Downlink Control Channel (PDCCH) to the user equipment, so that the user equipment extracts the indication information of the aperiodic ZP CSI-RS resource set with a preset number of bits from the PDCCH, determines a selected aperiodic ZP CSI-RS resource set according to an extraction result, and determines a position of a ZP CSI-RS resource indicated by the selected aperiodic ZP CSI-RS resource set in the K time slots; wherein the PDCCH schedules the K time slots for transmitting a Physical Downlink Shared Channel (PDSCH), where K is a positive integer and J is a positive integer.

Optionally, the configuration module includes: a first determination sub-module, adapted to determine a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; and a first configuration sub-module, adapted to configure the selected aperiodic ZP CSI-RS resource set to be located in a first time slot of the K time slots, and use the value of the $\lceil \log_2 J \rceil$ bits as the indication information of the aperiodic ZP CSI-RS resource set.

Optionally, the configuration module includes: a second determination sub-module, adapted to determine a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; and a second configuration sub-module, adapted to configure the selected aperiodic ZP CSI-RS resource set to be located in all of the K time slots of the PDSCH, and use the value of the $\lceil \log_2 J \rceil$ bits as the indication information of the aperiodic ZP CSI-RS resource set.

Optionally, the configuration module includes: a third determination sub-module, adapted to determine a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; an offset determination sub-module, adapted to determine a value of an offset according to the position of the selected aperiodic ZP CSI-RS resource set in the K time slots, where a number of bits occupied by the offset is $\lceil \log_2 K \rceil$; and an offset configuration sub-module, adapted to configure the offset in the selected aperiodic ZP CSI-RS resource set; a third configuration sub-module, adapted to use the value of the $\lceil \log_2 J \rceil$ bits as the indication information of the aperiodic ZP CSI-RS resource set.

Optionally, the configuration module includes: a fourth determination sub-module, adapted to determine a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; a second remaining bits determination sub-module, adapted to determine a value of a remaining bits according to the position of the selected aperiodic ZP CSI-RS resource set in the K time slots; and a fourth configuration sub-module, adapted to use the value of the $\lceil \log_2 J \rceil$ bits and the value of the remaining bits as the indication information of the aperiodic ZP CSI-RS resource set.

Optionally, a number of the remaining bits of the indication information is $\lceil \log_2 K \rceil$, and the number of bits of the indication information is a sum of $\lceil \log_2 J \rceil$ and $\lceil \log_2 K \rceil$.

In an embodiment of the present disclosure, a storage medium having computer instructions stored therein is provided, wherein once the computer instructions are executed, the above aperiodic ZP CSI-RS resource set determination method or the above aperiodic ZP CSI-RS resource set configuration method is performed.

In an embodiment of the present disclosure, a user equipment including a memory and a processor is provided, wherein the memory has computer instructions stored therein, and when the processor executes the computer instructions, the above aperiodic ZP CSI-RS resource set determination method is performed.

In an embodiment of the present disclosure, a network end including a memory and a processor is provided, wherein the memory has computer instructions stored therein, and when the processor executes the computer instructions, the above aperiodic ZP CSI-RS resource set configuration method is performed.

Embodiments of the present disclosure may provide following advantages.

In embodiments of the present disclosure, a PDCCH is received, wherein the PDCCH schedules K time slots for transmitting a Physical Downlink Shared Channel (PDSCH); an indication information of the aperiodic ZP CSI-RS resource set from the PDCCH is extracted, wherein the indication information has a preset number of bits; $\lceil \log_2 J \rceil$ bits are extracted from the indication information, and a selected aperiodic ZP CSI-RS resource set is determined according to an extraction result, where J is a number of available aperiodic ZP CSI-RS resource sets; and according to a comparison result between the number of bits of the indication information and $\lceil \log_2 J \rceil$, a position of a ZP CSI-RS resource indicated by the selected aperiodic ZP CSI-RS resource set in the K time slots is determined. According to embodiments of the present disclosure, while receiving the PDCCH, a UE can extract the indication information of the aperiodic ZP CSI-RS resource set with the preset number of bits, determine the selected aperiodic ZP CSI-RS resource set, and then determine the position of the ZP CSI-RS resource indicated by the selected aperiodic ZP CSI-RS resource set in the K time slots. However in prior art, because which time slot of the PDSCH the ZP CSI-RS is located in is not specified, the UE cannot extract data correctly, and thus cannot decode accurately. According to embodiments of the present disclosure, the UE can determine the position of the ZP CSI-RS resource indicated by the selected aperiodic ZP CSI-RS resource set in the K time slots.

Further, in the embodiment of the present invention, a plurality of methods may be used to make the UE clarify the position of the ZP CSI-RS resource indicated by the selected aperiodic ZP CSI-RS resource set in the K time slots, so that user experience can be improved.

DETAILED DESCRIPTION

In an existing NR Slot Aggregation scenario, a PDCCH can be used to schedule multiple time slots to send a PDSCH. If the PDCCH sent by a base station to a user equipment (UE) includes an indication information of activating an aperiodic ZP CSI-RS, because the protocol does not specify which time slot of the PDSCH the ZP CSI-RS is located in, the UE cannot extract data correctly, and thus cannot decode accurately.

Inventors of the present disclosure discovered that, because the LTE settings are used, the UE cannot extract data correctly in prior art. Specifically, because the PDSCH does not support Slot Aggregation in LTE technology and the PDCCH only supports transmitting the PDSCH in one sub-frame, when the PDCCH, which is scheduled by the base station to send the PDSCH to the UE, includes an indication information to activate an aperiodic ZP CSI-RS, the ZP CSI-RS is defaulted to be located in a single time slot occupied by the PDSCH while being activated, that is, there is no need to confirm the time slot sequence number.

In embodiments of the present disclosure, a Physical Downlink Control Channel (PDCCH) is received, wherein the PDCCH schedules K time slots for transmitting a Physical Downlink Shared Channel (PDSCH); an indication information of the aperiodic ZP CSI-RS resource set from the PDCCH is extracted, wherein the indication information has a preset number of bits; $\lceil \log_2 J \rceil$ bits are extracted from the indication information, and a selected aperiodic ZP CSI-RS resource set is determined according to an extraction result, where J is a number of available aperiodic ZP CSI-RS resource sets; and according to a comparison result between the number of bits of the indication information and $\lceil \log_2 J \rceil$, a position of a ZP CSI-RS resource indicated by the selected aperiodic ZP CSI-RS resource set in the K time slots is determined. According to embodiments of the present disclosure, while receiving the PDCCH, a UE can extract the indication information of the aperiodic ZP CSI-RS resource set with the preset number of bits, determine the selected aperiodic ZP CSI-RS resource set, and then determine the position of the ZP CSI-RS resource indicated by the selected aperiodic ZP CSI-RS resource set in the K time slots. However in prior art, because which time slot of the PDSCH the ZP CSI-RS is located in is not specified, the UE cannot extract data correctly, and thus cannot decode accurately. According to embodiments of the present disclosure, the UE can determine the position of the ZP CSI-RS resource indicated by the selected aperiodic ZP CSI-RS resource set in the K time slots, so that the UE can determine the selected aperiodic ZP CSI-RS resource more accurately.

In order to clarify the object, characteristic and advantages of embodiments of the present disclosure, embodiments of present disclosure will be described clearly in detail in conjunction with accompanying drawings.

Figure 1:
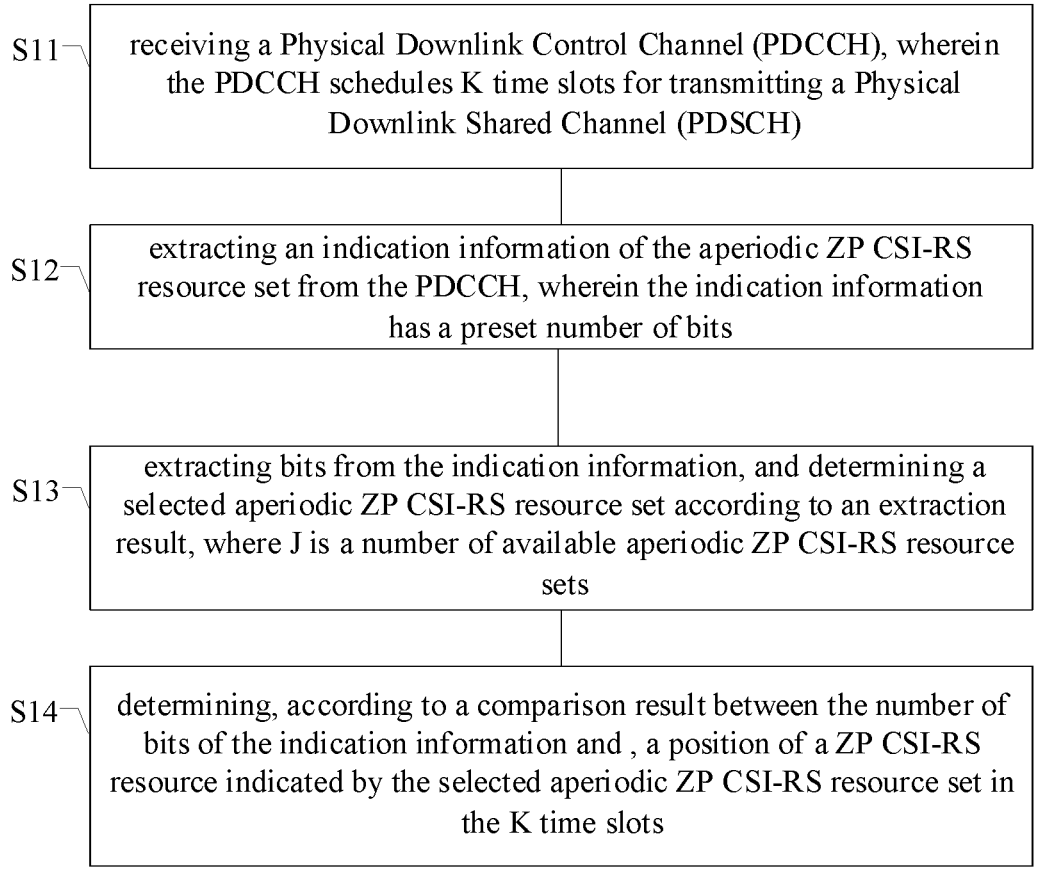
FIG. 1 is a flow chart of an aperiodic ZP CSI-RS resource set determination method according to an embodiment.

Referring to FIG. 1, FIG. 1 is a flow chart of an aperiodic ZP CSI-RS resource set determination method according to an embodiment. The aperiodic ZP CSI-RS resource set determination method may apply to a UE, for example, be executed by the UE. Referring to FIG. 1, the method includes S11 to S14.

In S11, a Physical Downlink Control Channel (PDCCH) is received, wherein the PDCCH schedules K time slots for transmitting a Physical Downlink Shared Channel (PDSCH).

In S12, an indication information of the aperiodic ZP CSI-RS resource set from the PDCCH is extracted, wherein the indication information has a preset number of bits.

In S13, J' bits are extracted from the indication information, and a selected aperiodic ZP CSI-RS resource set is determined according to an extraction result.

In S14, according to a comparison result between the number of bits of the indication information and J', a position of a ZP CSI-RS resource indicated by the selected aperiodic ZP CSI-RS resource set in the K time slots is determined.

Wherein K is a positive integer, J is a positive integer, J is a number of available aperiodic ZP CSI-RS resource sets, and J' equals to $\lceil \log_2 J \rceil$.

In S11, the UE can determine the indication information of the aperiodic ZP CSI-RS resource set by receiving the PDCCH.

Specifically, in existing NR technology, a higher layer may configure Slot Aggregation for the UE, so that the PDCCH may be used to schedule multiple consecutive time slots to send the PDSCH. Each time slot sends a same transport block (TB) by using different Redundancy Versions (RV).

Furthermore, in the existing NR technology, the value of K may be selected from: 1, 2, 4, 8. That is, the PDCCH may schedule 1 time slot, 2 time slots, 4 time slots or 8 time slots, to send the PDSCH.

In S12, the UE may determine which aperiodic ZP CSI-RS resource set is to be selected by extracting the indication information of the aperiodic ZP CSI-RS resource set with the preset number of bits.

Specifically, a configuration method of aperiodic ZP CSI-RS resource set includes: for each Bandwidth part (BWP), the higher layer configures J available aperiodic ZP CSI-RS resource sets to the UE; when the base station sends the PDCCH to schedule the PDSCH to the UE, the PDCCH includes 2 bits to indicate an activated aperiodic ZP CSI-RS resource set, so as to inform the UE that there is no data at the location of the activated ZP CSI-RS resource set.

Furthermore, in the existing NR technology, the value of J may usually be 3 or 4, that is, the number of available aperiodic ZP CSI-RS resource sets is 3 or 4. When the value of J is 3, or $\lceil \log_2 J \rceil = 2$, the codeword "00" is usually reserved to indicate that the aperiodic ZP CSI-RS resource set is not activated, and the codewords "01", "10" and "11" are used to indicate three specific aperiodic ZP CSI-RS resource sets. When the value of J is 4, $\lceil \log_2 J \rceil = 2$.

In some embodiments, the number of bits of the indication information of the aperiodic ZP CSI-RS resource set is the preset number of bits. In some embodiments, the number of bits of the indication information may be $\lceil \log_2 J \rceil$ or greater than $\lceil \log_2 J \rceil$.

In S13, $\lceil \log_2 J \rceil$ bits are extracted from the indication information, and a selected aperiodic ZP CSI-RS resource set is determined according to an extraction result.

Specifically, the step of determining the selected aperiodic ZP CSI-RS resource set according to the extraction result may include: determining a value of the extraction result, wherein a sequence number of the selected aperiodic ZP CSI-RS resource set in the J available aperiodic ZP CSI-RS resource sets is determined to be the value of the extraction result.

Furthermore, take the value of J as 3 as an example: first, $\lceil \log_2 J \rceil = 2$ bits are extracted from the indication information; if the 2 bits are 01, the value of the extraction result is determined to be 1; if the 2 bits are 10, the value of the extraction result is determined to be 2; if the 2 bits are 11, the value of the extraction result is determined to be 3; and then the sequence number of the selected aperiodic ZP CSI-RS resource set in the J available aperiodic ZP CSI-RS resource sets is determined to be the value of the extraction result.

In some embodiments, the UE can determine the selected aperiodic ZP CSI-RS resource set by extracting the indication information and then extracting the $\lceil \log_2 J \rceil$ bits the indication information, and can also determine a specific time-frequency domain resource information of a ZP CSI-RS resource in a certain time slot that is indicated by the selected aperiodic ZP CSI-RS resource set.

In the following steps, which one of the K time slots the ZP CSI-RS resource is located is determined.

In S14, according to a comparison result between the number of bits of the indication information and $\lceil \log_2 J \rceil$, a position of the ZP CSI-RS resource indicated by the selected aperiodic ZP CSI-RS resource set in the K time slots is determined.

In a first specific implementation according to embodiments of the present disclosure, if the number of bits of the indication information is equal to $\lceil \log_2 J \rceil$, the selected aperiodic ZP CSI-RS resource set is determined to be located in a first time slot of the K time slots.

Figure 2:
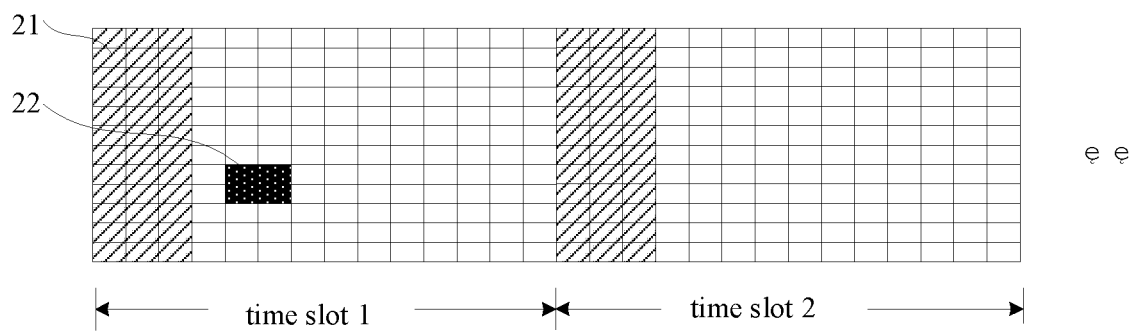
FIG. 2 is a schematic diagram of a first way to determine a position of a ZP CSI-RS resource in K time slots according to an embodiment.

Referring to FIG. 2, FIG. 2 is a schematic diagram of a first way to determine a position of a ZP CSI-RS resource in K time slots according to an embodiment.

Specifically, a PDCCH 21 schedules K time slots to transmit a PDSCH. FIG. 2 shows first two time slots, including time slot 1 and time slot 2, and other time slots are indicated with an ellipsis. A network end may configure a selected aperiodic ZP CSI-RS resource set 22 to be located in a first time slot of the K time slots, and the UE may determine that the selected aperiodic ZP CSI-RS resource set 22 is located in the first time slot of the K time slots, according to the number of bits of the indication information being equal to $\lceil \log_2 J \rceil$, that is, there are no remaining bits.

In a second specific implementation according to embodiments of the present disclosure, if the number of bits of the indication information is equal to $\lceil \log_2 J \rceil$, the selected aperiodic ZP CSI-RS resource set is determined to be located in all of the K time slots of the PDSCH.

Figure 3:
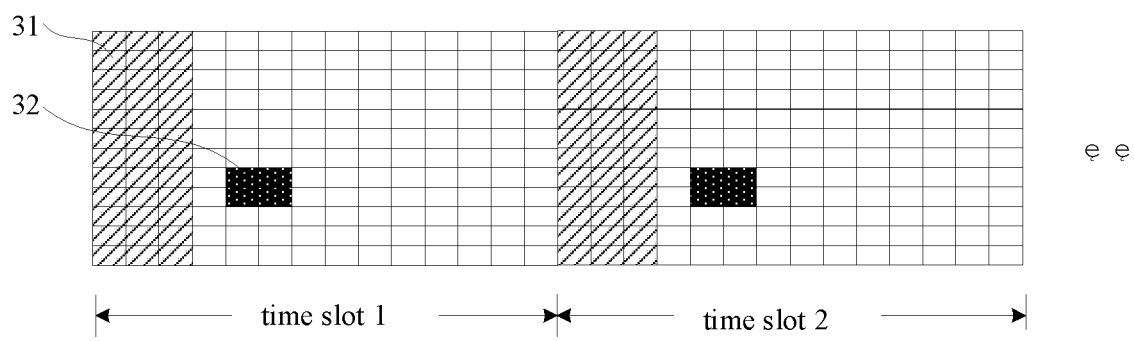
FIG. 3 is a schematic diagram of a second way to determine a position of a ZP CSI-RS resource in K time slots according to another embodiment.

Referring to FIG. 3, FIG. 3 is a schematic diagram of a second way to determine a position of a ZP CSI-RS resource in K time slots according to an embodiment.

Specifically, a PDCCH 31 schedules K time slots to transmit a PDSCH. FIG. 3 shows first two time slots, including time slot 1 and time slot 2, and other time slots are indicated with an ellipsis. A network end may configure a selected aperiodic ZP CSI-RS resource set 32 to be located in all of the K time slots of the PDSCH, and the UE may determine that the selected aperiodic ZP CSI-RS resource set 32 is located in all of the K time slots, according to the number of bits of the indication information being equal to $\lceil \log_2 J \rceil$, that is, there are no remaining bits.

In a third specific implementation according to embodiments of the present disclosure, if the number of bits of the indication information is equal to $\lceil \log_2 J \rceil$, the position of the selected aperiodic ZP CSI-RS resource set in the K time slots is determined according to a value of an offset.

Figure 4:
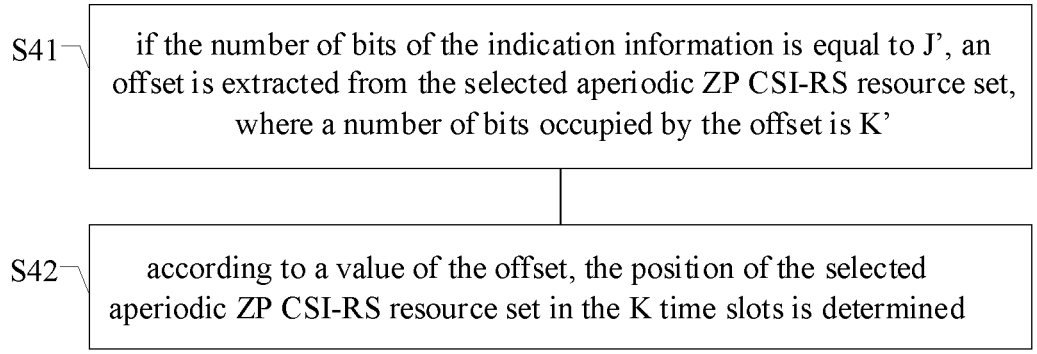
FIG. 4 schematically illustrates a flow chart of the S14 in FIG. 1 according to an embodiment.

Referring to FIG. 4, FIG. 4 schematically illustrates a flow chart of the S14 in FIG. 1 according to an embodiment. According to a comparison result between the number of bits of the indication information and $\lceil \log_2 J \rceil$, determining a position of a ZP CSI-RS resource indicated by the selected aperiodic ZP CSI-RS resource set in the K time slots includes S41 and S42, which will be described in detail hereafter.

In S41, if the number of bits of the indication information is equal to J', an offset is extracted from the selected aperiodic ZP CSI-RS resource set, where a number of bits occupied by the offset is K'.

In S42, according to a value of the offset, the position of the selected aperiodic ZP CSI-RS resource set in the K time slots is determined.

In some embodiments, J' is $\lceil \log_2 J \rceil$, and K' is $\lceil \log_2 K \rceil$.

Specifically, take K=8 as an example: $\lceil \log_2 K \rceil = 3$ bits, for example, 000, 001 to 111, may be used to indicate time slot 1, time slot 2 to time slot 8; then according to the value of the offset, which one of the K time slots the ZP CSI-RS resource is located may be determined.

Figure 5:
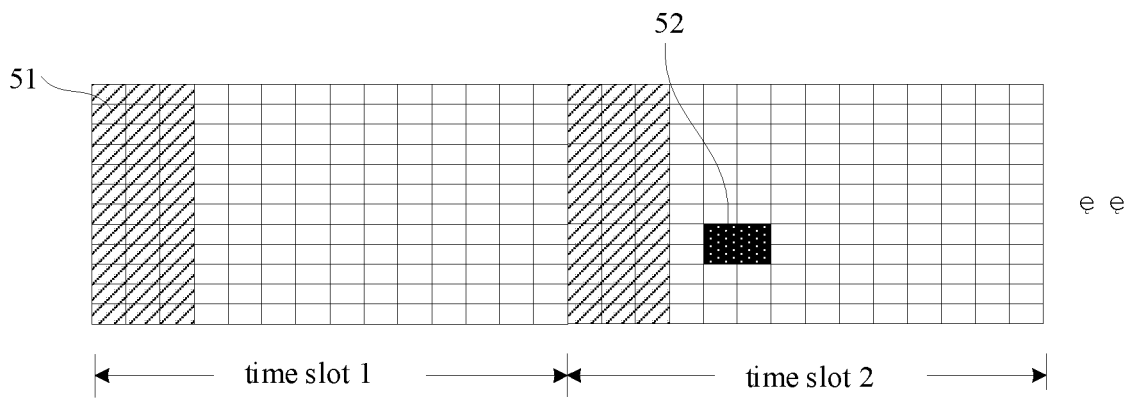
FIG. 5 is a schematic diagram of a third way to determine a position of a ZP CSI-RS resource in K time slots according to another embodiment.

Referring to FIG. 5, FIG. 5 is a schematic diagram of a third way to determine a position of a ZP CSI-RS resource in K time slots according to an embodiment.

Specifically, a PDCCH 51 schedules K time slots to transmit a PDSCH. FIG. 5 shows first two time slots, including time slot 1 and time slot 2, and other time slots are indicated with an ellipsis.

For example, if the value of the offset is 001, a network end may configure a selected aperiodic ZP CSI-RS resource set 52 to be located in a second time slot of the K time slots of the PDSCH, and the UE may determine that the selected aperiodic ZP CSI-RS resource set 52 is located in the second time slot of the K time slots of the PDSCH, according to the number of bits of the indication information being equal to $\lceil \log_2 J \rceil$, that is, there are no remaining bits.

According to embodiments of the present disclosure, compared with the first and second ways to determine the position of the ZP CSI-RS resource in the K time slots, the third way to determine the position of the ZP CSI-RS resource in the K time slots shown in FIGS. 4 and 5 has better flexibility. Specifically, in the first and second ways, which one of the K time slots of the PDSCH the selected aperiodic ZP CSI-RS resource set 52 is located is preset, so that it is difficult to adjust according to a specific situation. However, in the third way, the offset is used to indicate a specific time slot in the aperiodic ZP CSI-RS resource set, which can be adjusted according to the specific situation, that is, it has better flexibility.

In a fourth specific implementation according to embodiments of the present disclosure, if the number of bits of the indication information is greater than $\lceil \log_2 J \rceil$, the position of the selected aperiodic ZP CSI-RS resource set in the K time slots is determined according to remaining bits. Compared with the three specific implementation methods described above, the indication information in the fourth specific implementation method has a greater length.

Figure 6:
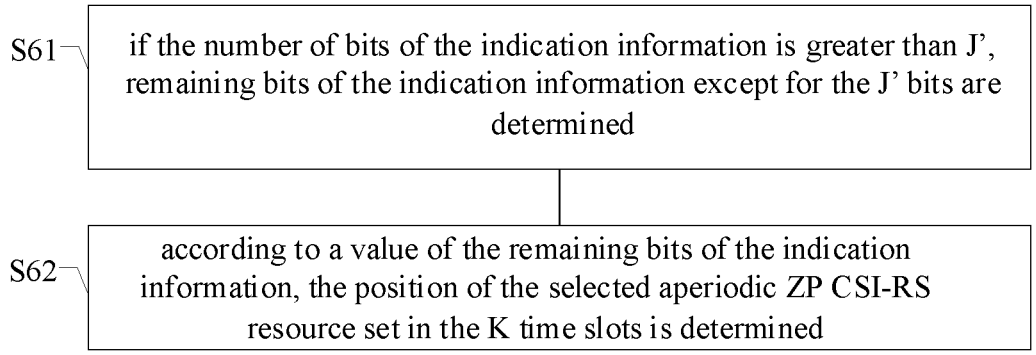
FIG. 6 schematically illustrates a flow chart of the S14 in FIG. 1 according to another embodiment.

Referring to FIG. 6, FIG. 6 schematically illustrates a flow chart of the S14 in FIG. 1 according to an embodiment. According to a comparison result between the number of bits of the indication information and $\lceil \log_2 J \rceil$, determining a position of a ZP CSI-RS resource indicated by the selected aperiodic ZP CSI-RS resource set in the K time slots includes S61 and S62, which will be described in detail hereafter.

In S61, if the number of bits of the indication information is greater than J', remaining bits of the indication information except for the J' bits are determined.

J' equals to $\lceil \log_2 J \rceil$.

Furthermore, a number of the remaining bits of the indication information is $\lceil \log_2 K \rceil$, and the number of bits of the indication information is a sum of $\lceil \log_2 J \rceil$ and $\lceil \log_2 K \rceil$.

Specifically, take K equal to 8 as an example: $\lceil \log_2 K \rceil = 3$ bits, the remaining 3 bits may be, for example, 000, 001 to 111, which may be used to indicate time slot 1, time slot 2 to time slot 8.

In S62, according to a value of the remaining bits of the indication information, the position of the selected aperiodic ZP CSI-RS resource set in the K time slots is determined.

Specifically, according to the value of the remaining bits, which time slot of the K time slots the ZP CSI-RS resource is located in can be determined.

Figure 7:
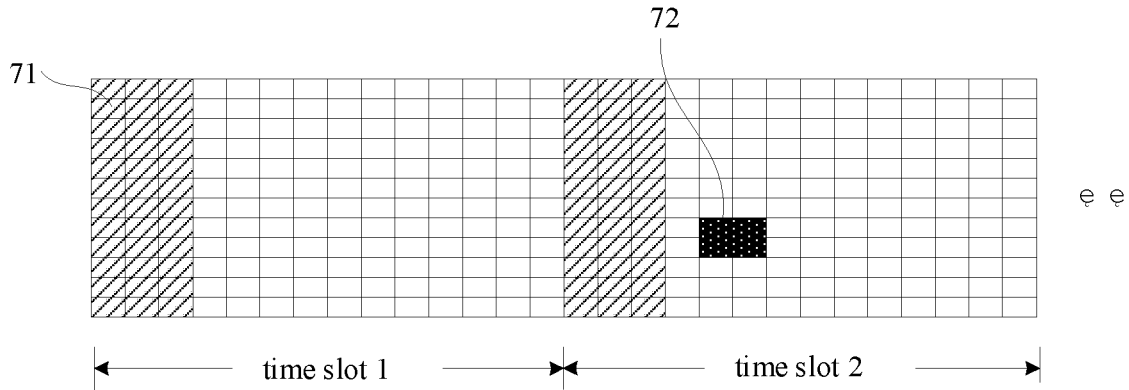
FIG. 7 is a schematic diagram of a fourth way to determine a position of a ZP CSI-RS resource in K time slots according to another embodiment.

Referring to FIG. 7, FIG. 7 is a schematic diagram of the fourth way to determine a position of a ZP CSI-RS resource in K time slots according to another embodiment.

Specifically, a PDCCH 71 schedules K time slots to transmit a PDSCH. FIG. 7 shows first two time slots, including time slot 1 and time slot 2, and other time slots are indicated with an ellipsis.

For example, if the remaining bits are 001, a network end may configure a selected aperiodic ZP CSI-RS resource set 72 to be located in a second time slot of the PDSCH, and the UE may determine that the selected aperiodic ZP CSI-RS resource set 52 is located in the second time slot of the K time slots.

According to embodiments of the present disclosure, compared with the first to the third ways to determine the position of the ZP CSI-RS resource in the K time slots, the fourth way to determine the position of the ZP CSI-RS resource in the K time slots shown in FIGS. 6 and 7 has better flexibility. Specifically, in the first and second ways, which one of the K time slots of the PDSCH the selected aperiodic ZP CSI-RS resource set 52 is located is preset, so that it is difficult to adjust according to a specific situation. In the third way, the offset is used to indicate a specific time slot in the aperiodic ZP CSI-RS resource set, which can be adjusted according to the specific situation. However, each adjustment needs to modify the aperiodic ZP CSI-RS resource set, resulting in high limitations to perform the adjustment. The fourth way uses the remaining bits in the indication information except for the J' bits to indicate the specific time slot, which can be adjusted more conveniently according to the specific situation, therefore, it has higher flexibility.

According to the embodiments of the present disclosure, multiple methods can be used to make the UE determine the position of the ZP CSI-RS resource indicated by the selected aperiodic ZP CSI-RS resource set in the K time slots, which facilitates to improve user experience.

According to embodiments of the present disclosure, while receiving the PDCCH, a UE can extract the indication information of the aperiodic ZP CSI-RS resource set with the preset number of bits, determine the selected aperiodic ZP CSI-RS resource set, and then determine the position of the ZP CSI-RS resource indicated by the selected aperiodic ZP CSI-RS resource set in the K time slots. However in prior art, because which time slot of the PDSCH the ZP CSI-RS is located in is not specified, the UE cannot extract data correctly, and thus cannot decode accurately. According to embodiments of the present disclosure, the UE can determine the position of the ZP CSI-RS resource indicated by the selected aperiodic ZP CSI-RS resource set in the K time slots, so that the UE can determine the selected aperiodic ZP CSI-RS resource more accurately.

Figure 8:
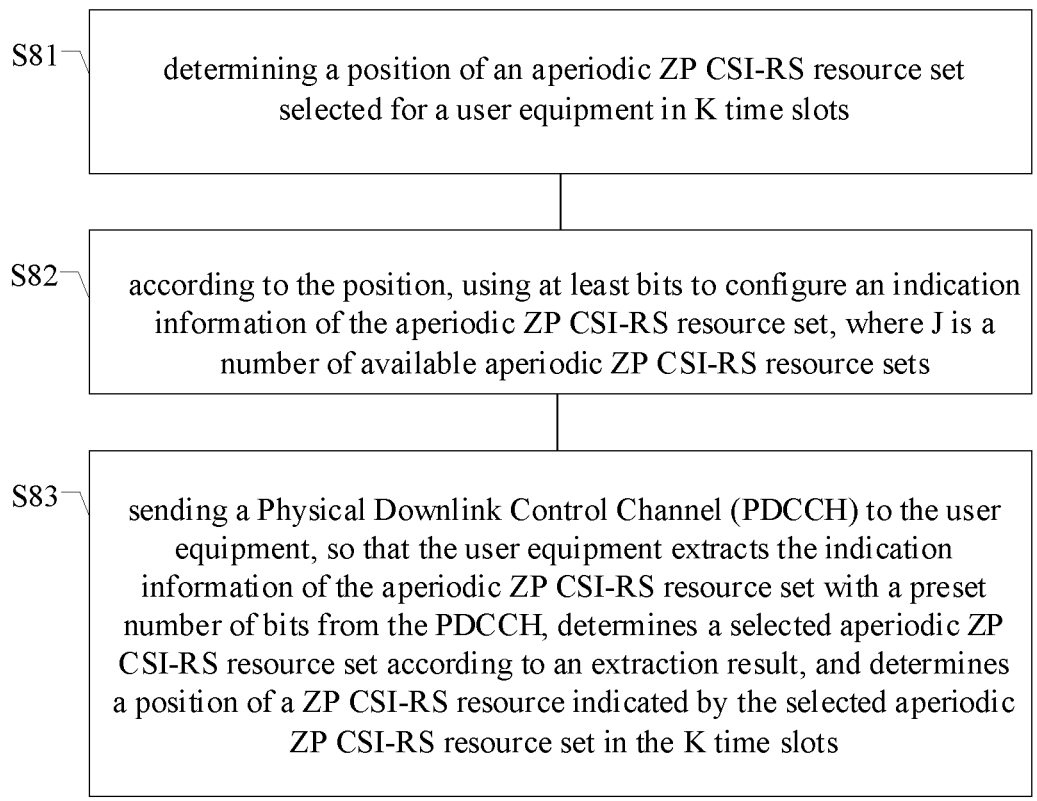
FIG. 8 is a flow chart of an aperiodic ZP CSI-RS resource set configuration method according to an embodiment.

Referring to FIG. 8, FIG. 8 is a flow chart of an aperiodic ZP CSI-RS resource set configuration method according to an embodiment. The aperiodic ZP CSI-RS resource set configuration method may apply to a network end, for example, be executed by the network end. Referring to FIG. 18, the method includes S81 to S83.

In S81, a position of an aperiodic ZP CSI-RS resource set selected for a user equipment in K time slots is determined.

In S82, according to the position, at least J' bits are used to configure an indication information of the aperiodic ZP CSI-RS resource set.

In S83, a Physical Downlink Control Channel (PDCCH) is sent to the user equipment, so that the user equipment extracts the indication information of the aperiodic ZP CSI-RS resource set with a preset number of bits from the PDCCH, determines a selected aperiodic ZP CSI-RS resource set according to an extraction result, and determines a position of a ZP CSI-RS resource indicated by the selected aperiodic ZP CSI-RS resource set in the K time slots.

The PDCCH schedules the K time slots for transmitting a Physical Downlink Shared Channel (PDSCH), where K is a positive integer, J is a positive integer, and J is a number of available aperiodic ZP CSI-RS resource sets and equals to $\lceil \log_2 J \rceil$.

In S81, the network end determines the position of the aperiodic ZP CSI-RS resource set selected for the user equipment in the K time slots.

In S82, at least $\lceil \log_2 J \rceil$ bits are used to configure the indication information of the aperiodic ZP CSI-RS resource set.

In a first specific implementation according to embodiments of the present disclosure, using at least $\lceil \log_2 J \rceil$ bits to configure an indication information of the aperiodic ZP CSI-RS resource set includes: determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; configuring the selected aperiodic ZP CSI-RS resource set to be located in a first time slot of the K time slots, and using the value of the $\lceil \log_2 J \rceil$ bits as the indication information of the aperiodic ZP CSI-RS resource set.

For more details about the first specific implementation, please refer to the foregoing and the first way to determine the position of the ZP CSI-RS resource in K time slots shown in FIG. 2, which will not be repeated in detail here.

In a second specific implementation according to embodiments of the present disclosure, using at least $\lceil \log_2 J \rceil$ bits to configure an indication information of the aperiodic ZP CSI-RS resource set includes: determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; configuring the selected aperiodic ZP CSI-RS resource set to be located in all of the K time slots of the PDSCH, and using the value of the $\lceil \log_2 J \rceil$ bits as the indication information of the aperiodic ZP CSI-RS resource set.

For more details about the second specific implementation, please refer to the foregoing and the second way to determine the position of the ZP CSI-RS resource in K time slots shown in FIG. 3, which will not be repeated in detail here.

In a third specific implementation according to embodiments of the present disclosure, using at least $\lceil \log_2 J \rceil$ bits to configure an indication information of the aperiodic ZP CSI-RS resource set includes: determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; determining a value of an offset according to the position of the selected aperiodic ZP CSI-RS resource set in the K time slots, where a number of bits occupied by the offset is $\lceil \log_2 K \rceil$; configuring the offset in the selected aperiodic ZP CSI-RS resource set; and using the value of the $\lceil \log_2 J \rceil$ bits as the indication information of the aperiodic ZP CSI-RS resource set.

For more details about the third specific implementation, please refer to the foregoing and the third way to determine the position of the ZP CSI-RS resource in K time slots shown in FIG. 5, which will not be repeated in detail here.

In a fourth specific implementation according to embodiments of the present disclosure, using at least $\lceil \log_2 J \rceil$ bits to configure an indication information of the aperiodic ZP CSI-RS resource set includes: determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; determining a value of a remaining bits according to the position of the selected aperiodic ZP CSI-RS resource set in the K time slots; and using the value of the $\lceil \log_2 J \rceil$ bits and the value of the remaining bits as the indication information of the aperiodic ZP CSI-RS resource set.

Furthermore, a number of the remaining bits of the indication information is $\lceil \log_2 K \rceil$, and the number of bits of the indication information is a sum of $\lceil \log_2 J \rceil$ and $\lceil \log_2 K \rceil$.

For more details about the fourth specific implementation, please refer to the foregoing and the fourth way to determine the position of the ZP CSI-RS resource in K time slots shown in FIG. 7, which will not be repeated in detail here.

Still referring to FIG. 8, in a specific implementation of S83, the network end sends the PDCCH to the user equipment, so that the user equipment extracts the indication information of the aperiodic ZP CSI-RS resource set with a preset number of bits from the PDCCH, determines a selected aperiodic ZP CSI-RS resource set according to an extraction result, and determines a position of a ZP CSI-RS resource indicated by the selected aperiodic ZP CSI-RS resource set in the K time slots; wherein the PDCCH schedules the K time slots for transmitting a Physical Downlink Shared Channel (PDSCH), where K is a positive integer and J is a positive integer.

According to embodiments of the present disclosure, after determining the position of the selected aperiodic ZP CSI-RS resource set in the K time slots, the network configures the indication information of the aperiodic ZP CSI-RS resource set according to the position, so that after receiving the PDCCH, the UE can extract the indication information of the aperiodic ZP CSI-RS resource set with the preset number of bits, determine the selected aperiodic ZP CSI-RS resource set, and then determine the position of the ZP CSI-RS resource indicated by the selected aperiodic ZP CSI-RS resource set in the K time slots. However in prior art, because which time slot of the PDSCH the ZP CSI-RS is located in is not specified, the UE cannot extract data correctly, and thus cannot decode accurately. According to embodiments of the present disclosure, the UE can determine the position of the ZP CSI-RS resource indicated by the selected aperiodic ZP CSI-RS resource set in the K time slots, so that the UE can determine the selected aperiodic ZP CSI-RS resource more accurately.

Figure 9:
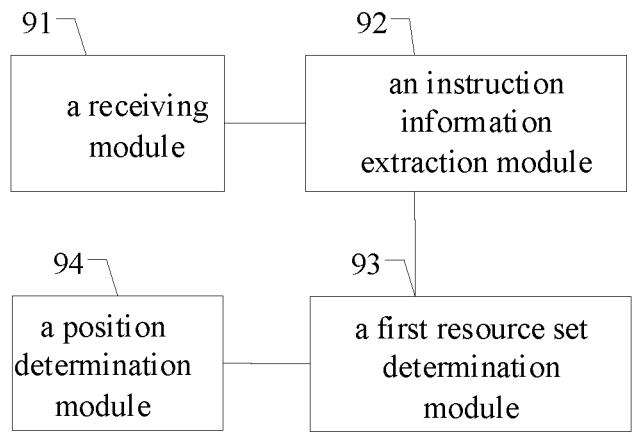
FIG. 9 is a schematic structural diagram of an aperiodic ZP CSI-RS resource set determination device according to an embodiment.

Referring to FIG. 9, FIG. 9 is a schematic structural diagram of an aperiodic ZP CSI-RS resource set determination device according to an embodiment. The aperiodic ZP CSI-RS resource set determination device applies to a user equipment (UE). The aperiodic ZP CSI-RS resource set determination device includes:

a receiving module 91, adapted to receive a Physical Downlink Control Channel (PDCCH), wherein the PDCCH schedules K time slots for transmitting a Physical Downlink Shared Channel (PDSCH);

an instruction information extraction module 92, adapted to extract an indication information of the aperiodic ZP CSI-RS resource set from the PDCCH, wherein the indication information has a preset number of bits;

a first resource set determination module 93, adapted to extract $\lceil \log_2 J \rceil$ bits from the indication information, and determine a selected aperiodic ZP CSI-RS resource set according to an extraction result, where J is a number of available aperiodic ZP CSI-RS resource sets; and a position determination module 94, adapted to determine, according to a comparison result between the number of bits of the indication information and $\lceil \log_2 J \rceil$, a position of a ZP CSI-RS resource indicated by the selected aperiodic ZP CSI-RS resource set in the K time slots; wherein K is a positive integer and J is a positive integer.

Furthermore, the first resource set determination module 93 includes: an extraction result determination sub-module (not shown in the figure), adapted to determining a value of the extraction result, where a sequence number of the selected aperiodic ZP CSI-RS resource set in the J available aperiodic ZP CSI-RS resource sets is equal to the value of the extraction result.

Figure 10:
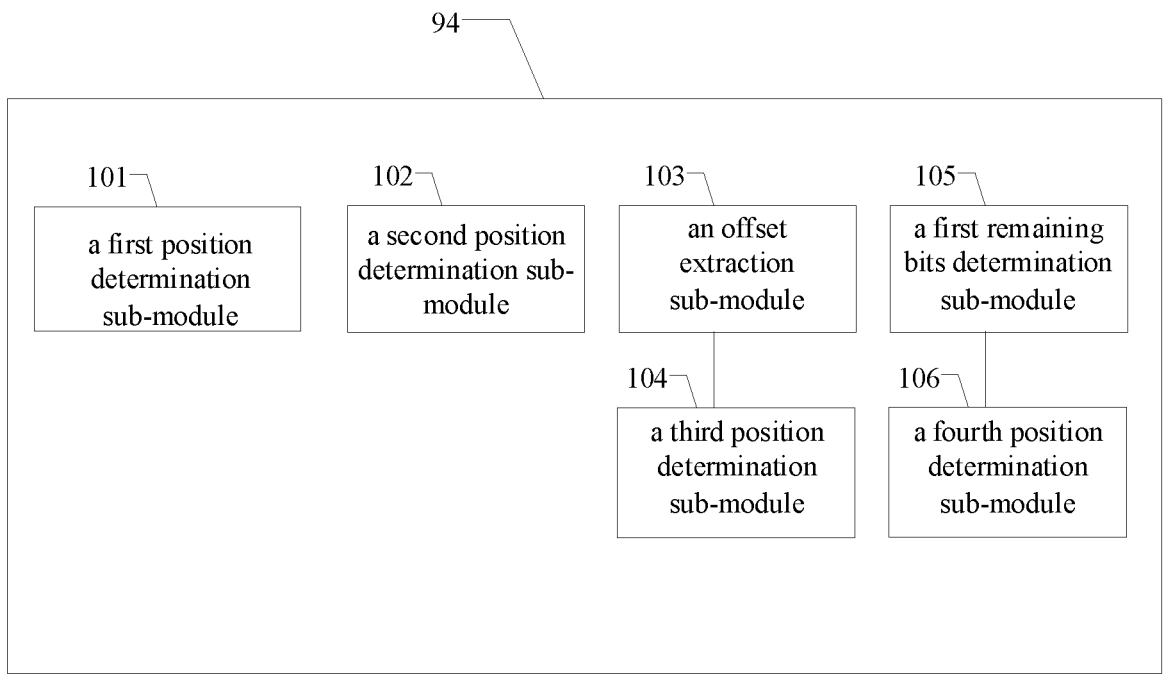
FIG. 10 is a schematic structural diagram of a position determination module 94 in FIG. 9 according to an embodiment.

Referring to FIG. 10, FIG. 10 is a schematic structural diagram of the position determination module 94 in FIG. 9 according to an embodiment. The position determination module 94 includes:

a first position determination sub-module 101, adapted to determine that the selected aperiodic ZP CSI-RS resource set is located in a first time slot of the K time slots, if the number of bits of the indication information is equal to $\lceil \log_2 J \rceil$;

a second position determination sub-module 102, adapted to determine that the selected aperiodic ZP CSI-RS resource set is located in all of the K time slots of the PDSCH, if the number of bits of the indication information is equal to $\lceil \log_2 J \rceil$;

an offset extraction sub-module 103, adapted to, if the number of bits of the indication information is equal to $\lceil \log_2 J \rceil$, extract an offset from the selected aperiodic ZP CSI-RS resource set, where a number of bits occupied by the offset is $\lceil \log_2 K \rceil$;

a third position determination sub-module 104, adapted to determine the position of the selected aperiodic ZP CSI-RS resource set in the K time slots according to a value of the offset;

a first remaining bits determination sub-module 105, adapted to determine a remaining bits of the indication information except for the $\lceil \log_2 J \rceil$ bits, if the number of bits of the indication information is greater than $\lceil \log_2 J \rceil$; and a fourth position determination sub-module 106, adapted to determine the position of the selected aperiodic ZP CSI-RS resource set in the K time slots, according to a value of the remaining bits of the indication information.

Furthermore, a number of the remaining bits of the indication information is $\log_2 K \rceil$, and the number of bits of the indication information is a sum of $\lceil \log_2 J \rceil$ and $\lceil \log_2 K \rceil$.

For more details about the principle, specific implementation and beneficial effects of the aperiodic ZP CSI-RS resource set determination device, please refer to the foregoing and the related description of the method for determining the aperiodic ZP CSI-RS resource set shown in FIGS. 1 to 7, which will not be described in detail here.

Figure 11:
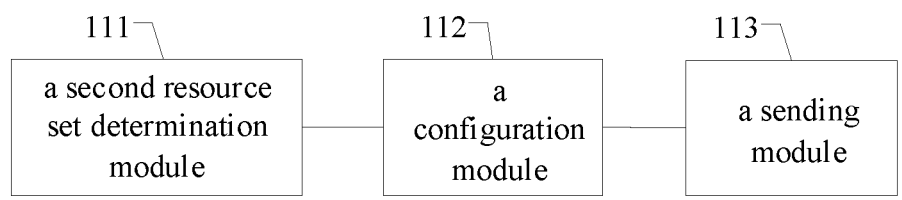
FIG. 11 is a schematic structural diagram of an aperiodic ZP CSI-RS resource set configuration device according to an embodiment.

Referring to FIG. 11, FIG. 11 is a schematic structural diagram of an aperiodic ZP CSI-RS resource set configuration device according to an embodiment. The aperiodic ZP CSI-RS resource set configuration device applies to a network end. The aperiodic ZP CSI-RS resource set configuration device includes:

a second resource set determination module 111, adapted to determine a position of an aperiodic ZP CSI-RS resource set selected for a user equipment in K time slots;

a configuration module 112, adapted to, according to the position, use at least $\lceil \log_2 J \rceil$ bits to configure an indication information of the aperiodic ZP CSI-RS resource set, where J is a number of available aperiodic ZP CSI-RS resource sets;

a sending module 113, adapted to send a Physical Downlink Control Channel (PDCCH) to the user equipment, so that the user equipment extracts the indication information of the aperiodic ZP CSI-RS resource set with a preset number of bits from the PDCCH, determines a selected aperiodic ZP CSI-RS resource set according to an extraction result, and determines a position of a ZP CSI-RS resource indicated by the selected aperiodic ZP CSI-RS resource set in the K time slots; wherein the PDCCH schedules the K time slots for transmitting a Physical Downlink Shared Channel (PDSCH), where K is a positive integer and J is a positive integer.

Figure 12:
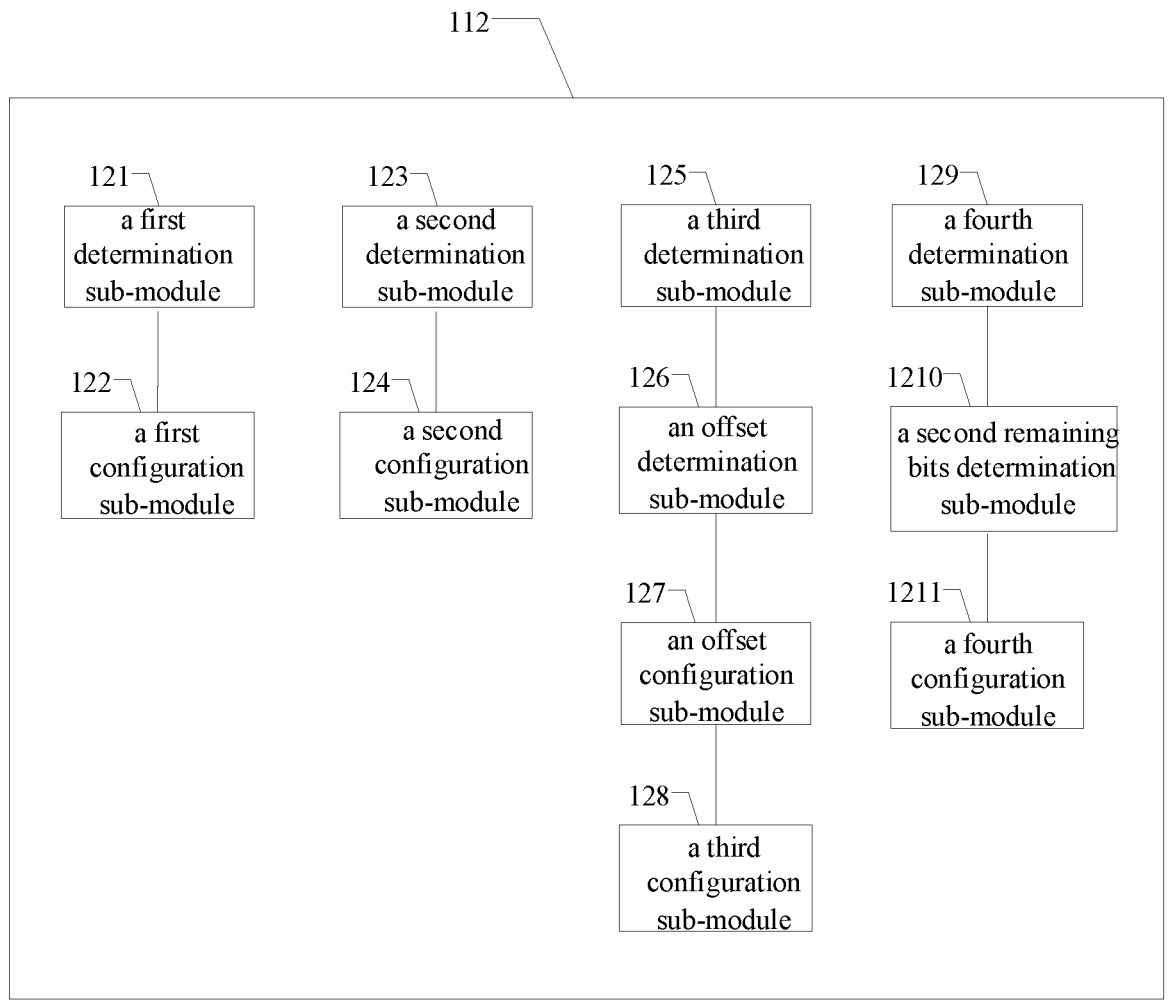
FIG. 12 is a schematic structural diagram of a configuration module 112 in FIG. 11 according to an embodiment.

Referring to FIG. 12, FIG. 12 is a schematic structural diagram of the configuration module 112 in FIG. 11 according to an embodiment. The configuration module 112 applies to a network end, including:

a first determination sub-module 121, adapted to determine a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits;

a first configuration sub-module 122, adapted to configure the selected aperiodic ZP CSI-RS resource set to be located in a first time slot of the K time slots, and use the value of the $\lceil \log_2 J \rceil$ bits as the indication information of the aperiodic ZP CSI-RS resource set;

a second determination sub-module 123, adapted to determine a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits;

a second configuration sub-module 124, adapted to configure the selected aperiodic ZP CSI-RS resource set to be located in all of the K time slots of the PDSCH, and use the value of the $\lceil \log_2 J \rceil$ bits as the indication information of the aperiodic ZP CSI-RS resource set;

a third determination sub-module 125, adapted to determine a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits;

an offset determination sub-module 126, adapted to determine a value of an offset according to the position of the selected aperiodic ZP CSI-RS resource set in the K time slots, where a number of bits occupied by the offset is $\lceil \log_2 K \rceil$;

an offset configuration sub-module 127, adapted to configure the offset in the selected aperiodic ZP CSI-RS resource set;

a third configuration sub-module 128, adapted to use the value of the $\lceil \log_2 J \rceil$ bits as the indication information of the aperiodic ZP CSI-RS resource set;

a fourth determination sub-module 129, adapted to determine a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits;

a second remaining bits determination sub-module 1210, adapted to determine a value of a remaining bits according to the position of the selected aperiodic ZP CSI-RS resource set in the K time slots; and a fourth configuration sub-module 1211, adapted to use the value of the $\lceil \log_2 J \rceil$ bits and the value of the remaining bits as the indication information of the aperiodic ZP CSI-RS resource set.

Furthermore, a number of the remaining bits of the indication information is $\lceil \log_2 K \rceil$, and the number of bits of the indication information is a sum of $\lceil \log_2 J \rceil$ and $\lceil \log_2 K \rceil$.

For more details about the principle, specific implementation and beneficial effects of the aperiodic ZP CSI-RS resource set configuration device, please refer to the foregoing and the related description of the method for configuring the aperiodic ZP CSI-RS resource set shown in FIG. 8, which will not be described in detail here.

In an embodiment of the present disclosure, a storage medium having computer instructions stored therein is provided, wherein once the computer instructions are executed, the above aperiodic ZP CSI-RS resource set determination method as shown in FIGS. 1 to 7, or the above aperiodic ZP CSI-RS resource set configuration method as shown in FIG. 8 is performed. The storage medium may be a computer readable storage medium, for example, including a non-volatile or non-transitory memory, an optical disk, a mechanical disk, a solid disk or the like.

In an embodiment of the present disclosure, a user equipment including a memory and a processor is provided, wherein the memory has computer instructions stored therein, and when the processor executes the computer instructions, the above aperiodic ZP CSI-RS resource set determination method as shown in FIGS. 1 to 7 is performed. The user equipment may include but not limited to a mobile phone, a computer or a tablet computer.

In an embodiment of the present disclosure, a network end including a memory and a processor is provided, wherein the memory has computer instructions stored therein, and when the processor executes the computer instructions, the above aperiodic ZP CSI-RS resource set configuration method as shown in FIG. 8 is performed. The network end may include but not limited to a base station or a server.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An aperiodic Zero Power Channel State Information Reference Signal (ZP CSI-RS) resource set determination method, comprising:

receiving a Physical Downlink Control Channel (PDCCH), wherein the PDCCH schedules K time slots for transmitting a Physical Downlink Shared Channel (PDSCH);

extracting an indication information of the aperiodic ZP CSI-RS resource set from the PDCCH, wherein the indication information has a preset number of bits;

extracting $\lceil \log_2 J \rceil$ bits from the indication information, and determining a selected aperiodic ZP CSI-RS resource set according to an extraction result, where J is a number of available aperiodic ZP CSI-RS resource sets; and determining, according to a comparison result between the number of bits of the indication information and $\lceil \log_2 J \rceil$, a position of a ZP CSI-RS resource indicated by the selected aperiodic ZP CSI-RS resource set in the K time slots;

wherein K is a positive integer and J is a positive integer.

2. The aperiodic ZP CSI-RS resource set determination method according to claim 1, wherein determining a selected aperiodic ZP CSI-RS resource set according to an extraction result comprises:

determining a value of the extraction result, and wherein a sequence number of the selected aperiodic ZP CSI-RS resource set in the J available aperiodic ZP CSI-RS resource sets is equal to the value of the extraction result.

3. The aperiodic ZP CSI-RS resource set determination method according to claim 1, wherein determining, according to a comparison result between the number of bits of the indication information and $\lceil \log_2 J \rceil$, a position of a ZP CSI-RS resource indicated by the selected aperiodic ZP CSI-RS resource set in the K time slots comprises:

if the number of bits of the indication information is equal to $\lceil \log_2 J \rceil$, determining that the selected aperiodic ZP CSI-RS resource set is located in a first time slot of the K time slots.

4. The aperiodic ZP CSI-RS resource set determination method according to claim 1, wherein determining, according to a comparison result between the number of bits of the indication information and $\lceil \log_2 J \rceil$, a position of a ZP CSI-RS resource indicated by the selected aperiodic ZP CSI-RS resource set in the K time slots comprises:

if the number of bits of the indication information is equal to $\lceil \log_2 J \rceil$, determining that the selected aperiodic ZP CSI-RS resource set is located in all of the K time slots of the PDSCH.

5. The aperiodic ZP CSI-RS resource set determination method according to claim 1, wherein determining, according to a comparison result between the number of bits of the indication information and $\lceil \log_2 J \rceil$, a position of a ZP CSI-RS resource indicated by the selected aperiodic ZP CSI-RS resource set in the K time slots comprises:

if the number of bits of the indication information is equal to $\lceil \log_2 J \rceil$, extracting an offset from the selected aperiodic ZP CSI-RS resource set, where a number of bits occupied by the offset is $\lceil \log_2 K \rceil$; and according to a value of the offset, determining the position of the selected aperiodic ZP CSI-RS resource set in the K time slots.

6. The aperiodic ZP CSI-RS resource set determination method according to claim 1, wherein determining, according to a comparison result between the number of bits of the indication information and $\lceil \log_2 J \rceil$, a position of a ZP CSI-RS resource indicated by the selected aperiodic ZP CSI-RS resource set in the K time slots comprises:

if the number of bits of the indication information is greater than $\lceil \log_2 J \rceil$, determining remaining bits of the indication information except for the $\lceil \log_2 J \rceil$ bits; and according to a value of the remaining bits of the indication information, determining the position of the selected aperiodic ZP CSI-RS resource set in the K time slots.

7. The aperiodic ZP CSI-RS resource set determination method according to claim 6, wherein a number of the remaining bits of the indication information is $\lceil \log_2 K \rceil$, and the number of bits of the indication information is a sum of $\lceil \log_2 J \rceil$ and $\lceil \log_2 K \rceil$.

8. An aperiodic Zero Power Channel State Information Reference Signal (ZP CSI-RS) resource set configuration method, comprising:

determining a position of an aperiodic ZP CSI-RS resource set selected for a user equipment in K time slots;

according to the position, using at least $\lceil \log_2 J \rceil$ bits to configure an indication information of the aperiodic ZP CSI-RS resource set, where J is a number of available aperiodic ZP CSI-RS resource sets; and sending a Physical Downlink Control Channel (PDCCH) to the user equipment, so that the user equipment extracts the indication information of the aperiodic ZP CSI-RS resource set with a preset number of bits from the PDCCH, determines a selected aperiodic ZP CSI-RS resource set according to an extraction result, and determines a position of a ZP CSI-RS resource indicated by the selected aperiodic ZP CSI-RS resource set in the K time slots;

wherein the PDCCH schedules the K time slots for transmitting a Physical Downlink Shared Channel (PDSCH), where K is a positive integer and J is a positive integer.

9. The aperiodic ZP CSI-RS resource set configuration method according to claim 8, wherein using at least $\lceil \log_2 J \rceil$ bits to configure an indication information of the aperiodic ZP CSI-RS resource set comprises:

determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; and configuring the selected aperiodic ZP CSI-RS resource set to be located in a first time slot of the K time slots, and using the value of the $\lceil \log_2 J \rceil$ bits as the indication information of the aperiodic ZP CSI-RS resource set.

10. The aperiodic ZP CSI-RS resource set configuration method according to claim 8, wherein using at least $\lceil \log_2 J \rceil$ bits to configure an indication information of the aperiodic ZP CSI-RS resource set comprises:

determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits; and configuring the selected aperiodic ZP CSI-RS resource set to be located in all of the K time slots of the PDSCH, and using the value of the $\lceil \log_2 J \rceil$ bits as the indication information of the aperiodic ZP CSI-RS resource set.

11. The aperiodic ZP CSI-RS resource set configuration method according to claim 8, wherein using at least $\lceil \log_2 J \rceil$ bits to configure an indication information of the aperiodic ZP CSI-RS resource set comprises:

determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits;

determining a value of an offset according to the position of the selected aperiodic ZP CSI-RS resource set in the K time slots, where a number of bits occupied by the offset is $\lceil \log_2 K \rceil$;

configuring the offset in the selected aperiodic ZP CSI-RS resource set; and using the value of the $\lceil \log_2 J \rceil$ bits as the indication information of the aperiodic ZP CSI-RS resource set.

12. The aperiodic ZP CSI-RS resource set configuration method according to claim 8, wherein using at least $\lceil \log_2 J \rceil$ bits to configure an indication information of the aperiodic ZP CSI-RS resource set comprises:

determining a value of the $\lceil \log_2 J \rceil$ bits, where a sequence number of the selected aperiodic ZP CSI-RS resource set in the J available aperiodic ZP CSI-RS resource sets is equal to the value of the $\lceil \log_2 J \rceil$ bits;

determining a value of a remaining bits according to the position of the selected aperiodic ZP CSI-RS resource set in the K time slots; and using the value of the $\lceil \log_2 J \rceil$ bits and the value of the remaining bits as the indication information of the aperiodic ZP CSI-RS resource set.

13. The aperiodic ZP CSI-RS resource set configuration method according to claim 12, wherein a number of the remaining bits of the indication information is $\lceil \log_2 K \rceil$, and the number of bits of the indication information is a sum of $\lceil \log_2 J \rceil$ and $\lceil \log_2 K \rceil$.

14. An aperiodic Zero Power Channel State Information Reference Signal (ZP CSI-RS) resource set determination device, comprising:

a receiving module, adapted to receive a Physical Downlink Control Channel (PDCCH), wherein the PDCCH schedules K time slots for transmitting a Physical Downlink Shared Channel (PDSCH);

an instruction information extraction module, adapted to extract an indication information of the aperiodic ZP CSI-RS resource set from the PDCCH, wherein the indication information has a preset number of bits;

a first resource set determination module, adapted to extract $\lceil \log_2 J \rceil$ bits from the indication information, and determine a selected aperiodic ZP CSI-RS resource set according to an extraction result, where J is a number of available aperiodic ZP CSI-RS resource sets; and a position determination module, adapted to determine, according to a comparison result between the number of bits of the indication information and $\lceil \log_2 J \rceil$, a position of a ZP CSI-RS resource indicated by the selected aperiodic ZP CSI-RS resource set in the K time slots;

wherein K is a positive integer and J is a positive integer.

15. The aperiodic ZP CSI-RS resource set determination device according to claim 14, wherein the first resource set determination module comprises:

an extraction result determination sub-module, adapted to determining a value of the extraction result, where a sequence number of the selected aperiodic ZP CSI-RS resource set in the J available aperiodic ZP CSI-RS resource sets is equal to the value of the extraction result.

16. The aperiodic ZP CSI-RS resource set determination device according to claim 14, wherein the position determination module comprises:

a first position determination sub-module, adapted to determine that the selected aperiodic ZP CSI-RS resource set is located in a first time slot of the K time slots, if the number of bits of the indication information is equal to $\lceil \log_2 J \rceil$.

17. The aperiodic ZP CSI-RS resource set determination device according to claim 14, wherein the position determination module comprises:

a second position determination sub-module, adapted to determine that the selected aperiodic ZP CSI-RS resource set is located in all of the K time slots of the PDSCH, if the number of bits of the indication information is equal to $\lceil \log_2 J \rceil$.

18. The aperiodic ZP CSI-RS resource set determination device according to claim 14, wherein the position determination module comprises:

an offset extraction sub-module, adapted to, if the number of bits of the indication information is equal to $\lceil \log_2 J \rceil$, extract an offset from the selected aperiodic ZP CSI-RS resource set, where a number of bits occupied by the offset is $\lceil \log_2 K \rceil$; and a third position determination sub-module, adapted to determine the position of the selected aperiodic ZP CSI-RS resource set in the K time slots according to a value of the offset.

19. The aperiodic ZP CSI-RS resource set determination device according to claim 14, wherein the position determination module comprises:

a first remaining bits determination sub-module, adapted to determine a remaining bits of the indication information except for the $\lceil \log_2 J \rceil$ bits, if the number of bits of the indication information is greater than $\lceil \log_2 J \rceil$; and a fourth position determination sub-module, adapted to determine the position of the selected aperiodic ZP CSI-RS resource set in the K time slots, according to a value of the remaining bits of the indication information.

20. The aperiodic ZP CSI-RS resource set determination device according to claim 19, wherein a number of the remaining bits of the indication information is $\lceil \log_2 K \rceil$, and the number of bits of the indication information is a sum of $\lceil \log_2 J \rceil$ and $\lceil \log_2 K \rceil$.

* * * * *